US010443277B2

(12) United States Patent
Basavarajappa et al.

(10) Patent No.: US 10,443,277 B2
(45) Date of Patent: Oct. 15, 2019

(54) FUEL TANK CAP LOCK WITH A REDUCED NUMBER OF COMPONENTS (75) Inventors: Madhu Basavarajappa, Düsseldorf (DE); Hendrik Wahmann, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 352 days.

(21) Appl. No.: 14/238,957

(22) PCT Filed: Jul. 14, 2012

(86) PCT No.: PCT/DE2012/000718
§ 371 (c)(1),
(2), (4) Date: Apr. 2, 2014

(87) PCT Pub. No.: WO2013/013654
PCT Pub. Date: Jan. 31, 2013

(65) Prior Publication Data
US 2014/0291996 A1  Oct. 2, 2014

(30) Foreign Application Priority Data

Jul. 22, 2011 (DE) .......... 10 2011 108 154
Aug. 15, 2011 (DE) .......... 10 2011 114 659
Oct. 18, 2011 (DE) .......... 10 2011 116 067

(51) Int. Cl.
*E05B 83/34* (2014.01)
*B60K 15/05* (2006.01)
(Continued)

(52) U.S. Cl.
CPC .............. *E05B 83/34* (2013.01); *B60K 15/05* (2013.01); *E05C 19/022* (2013.01);
(Continued)

(58) Field of Classification Search
CPC .......... E05B 83/34; E05B 63/22; E05C 19/02; E05C 19/06; E05C 19/022; E05C 19/028;
(Continued)

(56) References Cited

U.S. PATENT DOCUMENTS 578,763 A * 3/1897 Nash .................. E05B 17/04
70/379 R
1,427,253 A * 8/1922 Appleby ................ E05C 1/06
292/140
(Continued)

FOREIGN PATENT DOCUMENTS

DE    19747707      5/1999
DE    10304701 A1   8/2004
(Continued)

OTHER PUBLICATIONS

International Search Report for corresponding patent application No. PCT/DE2012/000718 dated Sep. 3, 2013.
(Continued)

*Primary Examiner* — Kristina R Fulton
*Assistant Examiner* — Faria F Ahmad
(74) *Attorney, Agent, or Firm* — Renner, Otto, Boisselle & Sklar, LLP (57) ABSTRACT The invention relates to a lock for a fuel tank cap or tailboard in a vehicle, comprising a locking bolt (1) which can be adjusted between an open and a closed position by opening and closing the cap or tailboard. Said fuel tank cap lock, in the housing (2) of the lock, is positively driven counter to the force of a compression spring (4) in the direction of its longitudinal axis (6) and about its longitudinal axis (6).

5 Claims, 8 Drawing Sheets (51) Int. Cl.
*E05C 19/02* (2006.01)
*E05C 19/06* (2006.01)
*E05C 19/16* (2006.01)

(52) U.S. Cl.
CPC ............ *B60K 2015/053* (2013.01); *B60K 2015/0515* (2013.01); *B60K 2015/0546* (2013.01); *B60K 2015/0561* (2013.01); *B60K 2015/0576* (2013.01); *B60K 2015/0584* (2013.01); *B60Y 2400/90* (2013.01); *E05C 19/02* (2013.01); *E05C 19/028* (2013.01); *E05C 19/06* (2013.01); *E05C 19/16* (2013.01); *E05C 19/165* (2013.01); *Y10T 292/084* (2015.04); *Y10T 292/0834* (2015.04); *Y10T 292/0837* (2015.04); *Y10T 292/0864* (2015.04); *Y10T 292/0868* (2015.04); *Y10T 292/096* (2015.04); *Y10T 292/101* (2015.04); *Y10T 292/1005* (2015.04); *Y10T 292/1013* (2015.04); *Y10T 292/1014* (2015.04); *Y10T 292/1016* (2015.04); *Y10T 292/54* (2015.04)

(58) Field of Classification Search
CPC ............ E05C 19/16; E05C 19/165; B60K 2015/0561; B60K 15/04; B60K 15/05; B60K 2015/0507; B60K 2015/0515; B60K 2015/0523; B60K 2015/053; B60K 2015/0538; B60K 2015/0546; B60K 2015/0553; B60K 2015/0592; Y10T 292/0868; Y10T 292/71; Y10T 292/084; Y10T 292/0837; Y10T 292/1005; Y10T 292/096; Y10T 292/101; Y10T 292/0976; Y10T 292/0993; Y10T 292/0998; Y10T 292/102; Y10T 292/0969; Y20T 292/0834; Y20T 292/0999; Y20T 292/1013; Y20T 292/54; Y20T 292/1016; Y20T 292/1014
USPC ....... 292/61, 342, 32, 37, 34, 177, 182, 137, 292/189, 187, 332, 140, 138, 170, 172, 292/176, 144; 296/97.22, 155, 86.2; 70/252, 185, 183
See application file for complete search history.

(56) References Cited

U.S. PATENT DOCUMENTS

| | | | | |
|---|---|---|---|---|
| 1,907,625 A * | 5/1933 | Vogt | E05B 65/0864 | 292/140 |
| 1,946,384 A * | 2/1934 | Baril | E05B 47/0002 | 292/137 |
| 2,055,289 A * | 9/1936 | Hanan | E05B 83/247 | 292/DIG. 14 |
| 2,249,294 A * | 7/1941 | Kohler | E05B 17/005 | 16/82 |
| 3,397,000 A * | 8/1968 | Nakanishi | E05B 65/0864 | 292/61 |
| 3,696,744 A * | 10/1972 | Etchell | B41F 27/1231 | 101/415.1 |
| 3,798,935 A * | 3/1974 | Blekking | E05B 65/0864 | 292/62 |
| 4,270,781 A * | 6/1981 | Nishimura | E05C 19/165 | 292/251.5 |
| 4,583,775 A * | 4/1986 | Bisbing | E05B 17/0025 | 292/64 |
| 4,601,502 A * | 7/1986 | Van Dyke | E05C 17/48 | 16/82 |
| 5,076,080 A * | 12/1991 | Fuss | E05C 3/042 | 292/66 |
| 5,120,093 A * | 6/1992 | Carney | E05C 17/48 | 16/82 |
| 5,165,738 A * | 11/1992 | McCormack | E05C 3/042 | 292/67 |
| 5,386,713 A * | 2/1995 | Wilson | E05B 47/0002 | 292/144 |
| 5,494,420 A * | 2/1996 | Mawhirt | F04B 7/06 | 417/499 |
| 5,609,371 A * | 3/1997 | Mader | E05B 17/2015 | 292/164 |
| 5,961,162 A * | 10/1999 | Glaser | E05B 9/08 | 292/198 |
| 6,098,434 A * | 8/2000 | Liou | B60R 25/086 | 70/360 |
| 6,116,660 A * | 9/2000 | Langkamp, Jr. | E05B 17/002 | 292/65 |
| 6,250,694 B1 * | 6/2001 | Weiland | E05C 19/022 | 292/110 |
| 6,318,771 B1 * | 11/2001 | Holloway | B60K 15/05 | 292/201 |
| 6,412,318 B1 * | 7/2002 | Shen | E05B 47/0661 | 70/217 |
| 6,647,751 B2 * | 11/2003 | Zillmann | B60R 25/02153 | 70/186 |
| 6,655,720 B2 * | 12/2003 | Rampen | E05B 65/0876 | 292/163 |
| 6,719,337 B1 * | 4/2004 | Ji | E05C 19/022 | 292/110 |
| 6,793,266 B2 * | 9/2004 | Park | B60K 15/05 | 220/86.2 |
| 6,817,958 B2 * | 11/2004 | Kaido | F16H 7/08 | 403/120 |
| 7,050,295 B2 * | 5/2006 | Kang | E05B 63/24 | 292/137 |
| 7,065,993 B2 * | 6/2006 | Fukushima | B60R 25/02153 | 70/183 |
| 7,152,892 B2 * | 12/2006 | Rechberg | A47G 25/065 | 292/300 |
| 7,210,319 B2 * | 5/2007 | Artsiely | B60R 25/008 | 292/34 |
| 7,267,379 B2 * | 9/2007 | Rusiana | E05B 15/101 | 292/137 |
| 7,441,427 B2 * | 10/2008 | Vickers | E05B 17/0025 | 70/127 |
| 7,585,001 B2 * | 9/2009 | Rose | F16L 37/086 | 285/305 |
| 7,870,768 B2 * | 1/2011 | Tanioka | B60R 25/02153 | 70/186 |
| 8,205,517 B2 * | 6/2012 | Fukushima | B60R 1/074 | 180/187 |
| 8,398,127 B2 * | 3/2013 | Persiani | B60K 15/05 | 292/163 |
| 8,720,968 B2 * | 5/2014 | Zalan | E05B 83/34 | 296/97.22 |
| 8,745,830 B2 * | 6/2014 | Liu | F16B 21/02 | 24/663 |
| 8,845,001 B2 * | 9/2014 | Kotama | B60L 58/12 | 296/97.22 |
| 9,395,796 B2 * | 7/2016 | Hurd | G06F 1/3203 | |
| 9,493,967 B2 * | 11/2016 | Basavarajappa | B60K 15/05 | |
| 2001/0050486 A1 * | 12/2001 | Bunting | E05C 17/48 | 292/342 |
| 2005/0062293 A1 * | 3/2005 | Shen | E05C 19/022 | 292/137 |
| 2005/0146156 A1 * | 7/2005 | Busch | B60K 15/05 | 296/97.22 |
| 2005/0194810 A1 * | 9/2005 | Beck | B60K 15/04 | 296/97.22 |
| 2005/0230999 A1 * | 10/2005 | Seto | B60K 15/05 | 296/97.22 |
| 2009/0139991 A1 * | 6/2009 | Nakaya | B60K 15/05 | 220/315 |
| 2009/0242291 A1 * | 10/2009 | Sagawa | B60L 58/20 | 180/65.265 |
| 2009/0307869 A1 * | 12/2009 | Salice | E05C 19/022 | 16/85 |
| 2010/0045049 A1 * | 2/2010 | Persiani | B60K 15/05 | 292/14 |

(56) References Cited

U.S. PATENT DOCUMENTS

| | | | | |
|---|---|---|---|---|
| 2010/0187837 A1* | 7/2010 | Danner | B60K 15/05 | 292/164 |
| 2012/0049565 A1* | 3/2012 | Saito | B60K 15/05 | 296/97.22 |
| 2013/0074985 A1* | 3/2013 | Ferguson | B67D 7/348 | 141/98 |
| 2013/0076059 A1* | 3/2013 | Zalan | E05B 83/34 | 296/97.22 |
| 2013/0102163 A1* | 4/2013 | Basavarajappa | B60K 15/05 | 439/34 |
| 2013/0154402 A1* | 6/2013 | Basavarajappa | B60K 15/05 | 310/20 |
| 2014/0042768 A1* | 2/2014 | Watanabe | B60K 15/05 | 296/97.22 |
| 2014/0084599 A1* | 3/2014 | Beck | E05B 83/34 | 292/58 |
| 2014/0145453 A1* | 5/2014 | Zhang | E05B 77/06 | 292/74 |
| 2014/0239646 A1* | 8/2014 | Betzen | E05B 81/40 | 292/139 |
| 2014/0312627 A1* | 10/2014 | Frommann | E05B 83/34 | 292/57 |
| 2015/0008685 A1* | 1/2015 | Beck | B60K 15/05 | 292/336.3 |
| 2015/0048644 A1* | 2/2015 | Georgi | B60K 15/05 | 296/97.22 |
| 2015/0114052 A1* | 4/2015 | Kitamura | E05B 83/28 | 70/158 |
| 2015/0115618 A1* | 4/2015 | Ito | E05B 83/34 | 292/137 |
| 2015/0337569 A1* | 11/2015 | Lim | E05B 83/34 | 292/197 |
| 2016/0290017 A1* | 10/2016 | Nakanishi | E05B 81/18 | |

FOREIGN PATENT DOCUMENTS

| | | |
|---|---|---|
| EP | 1018588 | 7/2000 |
| GB | 2149447 | 6/1985 |
| WO | 2008/059543 | 5/2008 |
| WO | 2011/081926 A1 | 7/2011 |

OTHER PUBLICATIONS

Written Opinion for corresponding patent application No. PCT/DE2012/000718.

International Preliminary Report on Patentability for corresponding patent application No. PCT/DE2012/000718 dated Jan. 28, 2014.

* cited by examiner

FUEL TANK CAP LOCK WITH A REDUCED NUMBER OF COMPONENTS

The invention relates to a lock for a fuel tank cap or tailboard in a vehicle with a locking bolt which can be shifted between an open and closed position by opening and closing the fuel tank cap and tailboard.

Locks for fuel tank caps are for example known from DE 10 2011 076 810. The fuel tank cap is closed manually when the filling process is complete, a force is exerted on a locking bolt; consequently, this shifts from its extended open position to its retracted closed position. When the fuel tank cap is activated, the bolt is simultaneously rotated about its longitudinal axis and thus fixed in the fuel tank cap at its end facing the fuel tank cap meaning that closure occurs. The mechanisms previously used in this context have a very complicated structure and encompass a multitude of components. Consequently, one of the implications of this is that comparatively strong drives are necessary for the closure process which is generally controlled via the central locking. The multitude of individual components with a complicated structure also leads to high installation costs and considerable susceptibility to malfunction. Tailboards must be understood to mean especially covers for charging sockets in an electric vehicle for the recharging of batteries.

The present invention therefore sets the task of creating a lock for a fuel tank cap or tailboard in a vehicle with a minimum number of components in order to simplify installation, reduce susceptibility to malfunction and to be able to use smaller drives to operate this lock.

According to a first execution form of the invention this task is solved by the locking bolt in the housing of the lock being forcibly actuated against the force of a compression spring in the direction of its longitudinal axis and around its longitudinal axis.

This formation and positioning of the locking bolt results in an especially compact lock for a fuel tank cap or tailboard in a vehicle which manages with a minimum number of components. For this purpose, the locking bolt in the housing of the lock which can be moved between an extended open position and a retracted closed position is forcibly actuated in the movement from the open to the closed position and back again. A compression spring acting in the longitudinal axis direction of the locking bolt leads to a direct and effective movement of the lock between the different positions in interaction with this forcible actuation.

The forcible actuation is located between the locking bolt and the housing in the form of a gate which is assigned to the locking bolt and/or the housing. Expediently, it is envisaged that a self-contained, all-round gate serves on its lateral surface in relation to the locking bolt as part of the forcible actuation.

A pin conducted in the gate on the lateral surface of the locking bolt serves as a companion piece to this gate on the housing side in relation to the housing as forcible actuation. This is always forcibly actuated in the self-contained gate which is formed in a track shape. Consequently, it always passes through the gate again when the locking bolt is shifted.

When the locking bolt is shifted between the open and closed position, it shifts on the specified, all-round gate, for which purpose this gate has two opposite sections which are fundamentally at a diagonal. These diagonal sections are comparatively long because they depict the path ultimately described by the locking bolt between the open and closed position in conjunction with the compressed spring orientated in the direction of the longitudinal axis.

The lock in accordance with the invention manages with a minimum of components if the movement of the locking bolt between its two positions can be achieved solely against the force of a compression spring acting in the longitudinal axis direction of the locking bolt. The rotation of the locking bolt is specified by the contour of the hysteresis/gate in interplay with the pin on the housing side, by the gate being formed with its corner points bevelled. These slants therefore almost assume the function of the pared down torsion springs. When the locking bolt is shifted by manual activation the pin always knocks on a contour or slant in the gate which then triggers the rotary movement of the locking bolt.

An unwanted opening of the fuel tank cap or tailboard is safely prevented if a gate section serving to secure a holding position of the locking bolt in its closed state is provided between the two diagonal sections. This is especially advantageous when the activation of the flap is too firm or too long, because the basin-like gate here enables a kind of intermediate setting of the pin conducted therein. This prevents the locking bolt unwantedly shifting from the retracted position corresponding to its closed position with simultaneous opening of the fuel tank cap or tailboard.

As the pin on locking bolts is in the closed position at the upper end of the gate, it is necessary for the gate section to be provided at the upper end of the gate. The section therefore extends to the upper transition between the two diagonal gate sections.

An especially preferred execution form of the invention envisages that the gate section is fundamentally v-shaped. This implies that the gate section for security purposes has two flanks arranged diagonally in a 'V' shape which can demonstrate a crosswise transition at their lower ends by the pin being located in the closed position of the locking bolt.

In other words, the gate section should have two diagonal sections arranged displaced to one another and a horizontal section connecting these in order to attain this additional securing position in the gate.

A supplementary proposal envisages that the fuel tank cap or tailboard is formed correspondingly to the gate section. This implies for example that a seal, preferably a rubber or plastic seal is located on the fuel tank cap which holds the locking bolt in the secured position in the gate section.

The task in accordance with the invention is also solved by the fact that a ratchet equipped with a drive serves to lock the fuel tank cap or tailboard which blocks the locking bolt when the fuel tank cap or tailboard is locked.

The ratchet can block the locking bolt when the tailboard is locked so that it cannot shift unwantedly. This mechanism too can be built comparatively simply and thus effectively because only this ratchet needs to be switched from a neutral position to a position where it prevents movement of the locking bolt via the advantageously especially compact drive.

To supplement this, it is envisaged that the ratchet is pressurised by a spring which exerts a force on the ratchet in the direction of the locking bolt. The spring acts in such a way that the ratchet is pressed against the locking bolt. On the one hand, the spring can block the movement of the retracted locking bolt; on the other hand the ratchet can only press against the locking bolt which is in a different position. Consequently, the ratchet fits closely against the locking bolt. Especially in this case, the invention demonstrates one of its advantages, namely that the fuel tank cap can be locked while it is still open. If the lock is activated when the fuel tank cap is still open, a drive moves the ratchet into a position in which the ratchet does not block a movement of the locking bolt, but fits closely against a surface of the locking bolt. The lock is active in this state but the fuel tank cap is open. Only when the fuel tank cap is closed does the locking bolt move into a position in which the ratchet blocks a movement of the locking bolt.

One execution form of the invention envisages that the ratchet has a pivoting arm formed corresponding to the locking bolt and/or a pivoting arm formed corresponding to the spring. The ratchet which is preferably formed as a single component therefore has at least one primary pivoting arm which blocks the movability of the locking bolt in a locked position which is controlled via the central locking, for example. The ratchet also has at least a second pivoting arm which is assigned to the spring which thus exerts force onto the ratchet in the direction of the locking bolt. Dependent on the installation of the second pivoting arm on the spring the primary pivoting arm pivots against the locking bolt or away from it. The position of the ratchet is thus determined via a motor attacking it. The ratchet can also be activated advantageously if is still not positioned in the lock before any opening formed corresponding to the ratchet and therefore still cannot assume its blocking position. Instead, the ratchet is pressed by the spring against the external contour of the lock as long as the fuel tank cap is open and the locking bolt is in its extended position. If the fuel tank cap is now closed or the locking bolt moves into its retracted position, the ratchet automatically falls into the opening of the locking bolt to a certain extent and blocks it.

For the purpose of this, the proposal must be understood in accordance with which the locking bolt must have a formed opening corresponding to the ratchet at its lower end. In a preferred variant, this is a groove running parallel to the longitudinal axis of the locking bolt into which the ratchet travels or is pushed as soon as the locking bolt has assumed its retracted position to which the configuration of the ratchet is tailored.

A supplementary proposal envisages that the lock is equipped with an emergency unlocking device to move the ratchet from its position blocking the locking bolt. This emergency unlocking device can be activated manually and/or via a drive. This emergency unlocking device acts on the ratchet in such a way that it is moved from its position blocking the locking bolt in order to facilitate a return of the locking bolt into the extended position corresponding to the opening position of the fuel tank cap.

The fact that the ratchet has a third pivoting arm assigned to the emergency unlocking device is the object of a further execution form. This means the third pivoting arm of the ratchet is activated via the emergency unlocking device and the latter is thus moved from its positioning blocking the locking bolt.

A further advantageous execution form of the invention envisages that the lock is equipped with a detection device for the opening state of the tailboard or fuel tank cap. It can be ascertained via this detection device whether the tailboard or fuel tank cap is open or closed. In conjunction with a visual and/or acoustic display which is equipped with an alarm function if necessary and is for example integrated into a vehicle dashboard it can thus be indicated to the driver whether the tailboard/fuel tank cap is open or closed, especially whether he has unintentionally driven away with an open or incompletely closed tailboard/fuel tank cap.

As part of a comparatively cost-effective implementation, it has been taken into consideration for example that a switching device which records the position of the locking bolt acts as a detection device. Via the switching device which is formed as a microswitch for example, it can be directly or indirectly realised in particular whether the locking bolt is in the retracted or extended position. Its change in position is known to be associated with a twisting of the locking bolt as a result of activation of the fuel tank cap, consequently via a recording of the position of the locking bolt by the switching device it can be concluded whether the fuel tank cap is open or closed.

It is expedient if the switching device and switch via which this is activated are arranged directly adjacent to the locking bolt. This means that the switching device is activated depending on the positioning of the locking bolt. This is the case in an especially suitable execution form of the invention in which the switch of the switching device fits closely to the contour of the locking bolt.

For switching over, the locking bolt has an opening which is positioned in the closed position of the locking bolt adjacent to the switching device. This means that the switch glides over the contour of the locking bolt to a certain extent. In the crucial position of the locking bolt, namely in its retracted position, the opening in the locking bolt and the switch are arranged adjacently. The switch of the switching device travels or glides into this opening, consequently a relevant signal can occur via the detection device formed as a switching device that the locking bolt is located in its retracted, closed position.

In order to simplify the interplay between the opening in the locking bolt and the switch it is envisaged that the opening has a control gate for the switch, i.e. the switch should assume its position in the opening and be able to leave it again just as easily.

An alternative to such a switching device envisages that an echo sensor serves in conjunction with a permanent magnet as a detection device. The movement of the permanent magnet is recorded via the echo sensor. There is relevant signalling which provides information on the state of opening of the fuel tank cap in conjunction with the present invention. An advantage of the echo sensor in conjunction with the permanent magnet is in the contactless function between the sensor and the magnet.

This is the case in particular when the echo sensor or permanent magnet is assigned to the locking bolt. As already mentioned above, the position of the locking bolt provides information on the state of opening of the fuel tank cap, consequently the retrieval of the locking bolt is especially advantageous, particularly as it can take place in a protected form in the housing of the lock.

This control can also be advantageously used in another way, if namely the detection device corresponds to a light unit arranged in the area of the fuel tank cap. Because it can be recorded via the detection device whether the fuel tank cap has just been opened and illumination of this surrounding area is therefore sensible, the light unit can also be controlled via the detection device the switching of which is integrated into the display system via stamping grids, for example. Especially where visibility conditions are unfavourable, this simplifies the fuelling or recharging of batteries of electric vehicles. The light unit can also or alternatively be used to provide information on the charging state, for example, especially in conjunction with such a battery. This means that the charging state of the battery can be displayed to the driver when the fuel tank cap is open.

The invention is characterised in particular by the fact that a lock is created for a tailboard or a fuel tank cap in a vehicle which manages with a minimum both in relation to the number and dimension of the necessary components. A locking bolt which can be moved between an extended open and a retracted closed position which is force-impelled via a gate opposite the housing of the lock is crucial for this. To this end, in relation to the locking bolt a self-contained, all-round gate serves and a pin conducted in this gate in relation to the housing. In an interplay with a compression spring, the barrel of the pin is controlled in the gate via the forcible actuation and the return to the start position is guaranteed. Tailboards are understood to mean in particular covers for charging sockets in an electric vehicle to recharge batteries which are used in electric vehicles alternatively to tank covers. The lock in accordance with the invention can also be used to lock the connections between the charging plug and the charging socket during the charging process of an electric vehicle.

Other details and advantages of the object of the invention result from the following description of the pertaining sketch which depicts a preferred execution example with the necessary details and individual components. Here is an overview of what is depicted in the individual figures.

FIG. 1 shows the view of the inside of a lock with a locking bolt 1 in open position. Only a section of the housing 2 with a relevant reference sign is shown for better illustration. The locking bolt 1 has a gate 5 on its lateral surface 7 which acts as forcible actuation 8 between the locking bolt 1 and the housing 2 in interplay with the pin 18. The drive in the form of a motor for the ratchet 25 is described with the reference sign 24 via which the locking bolt 1 is secured against further activation in the locked position.

Figure 1:
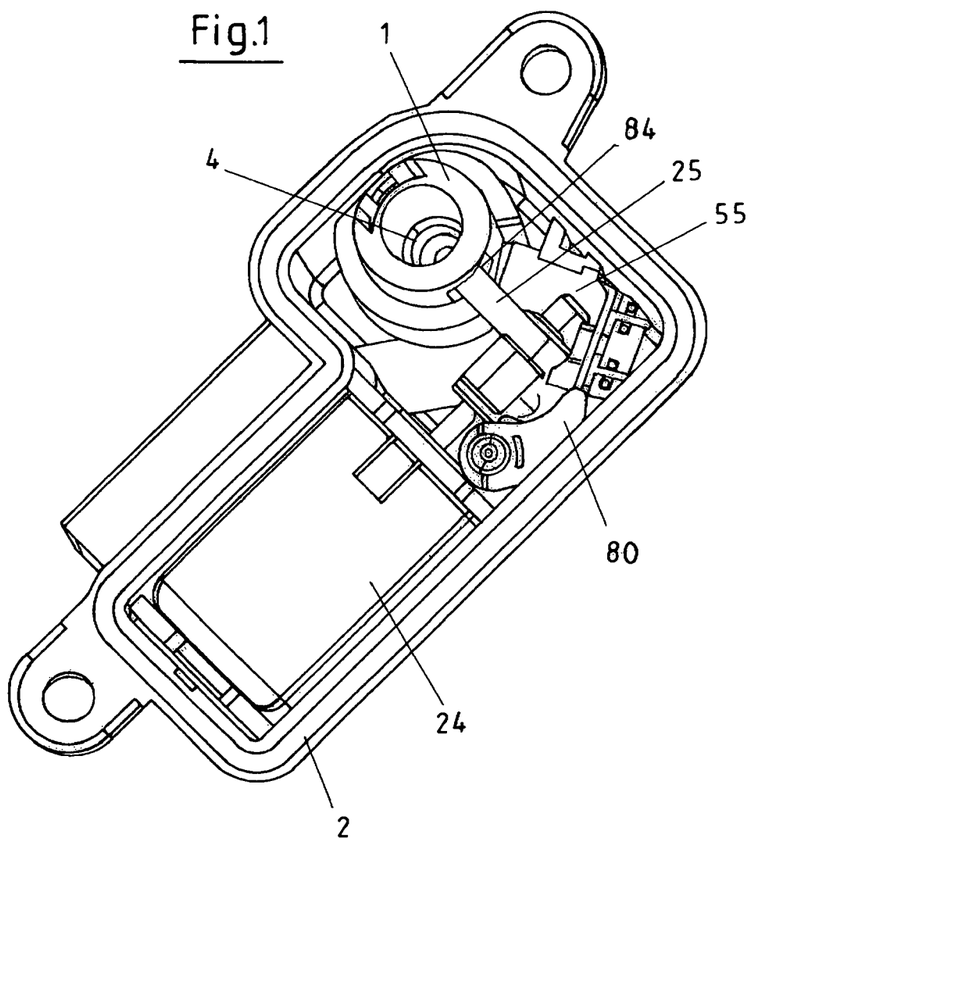
FIG. 1 the view into the lock housing with the locking bolt in the open state FIG. 2 the depiction in accordance with FIG. 1 with the locking bolt in the closed state FIG. 3 the locking mechanism in the closed state with the locking bolt in the closed position FIG. 4 the locking mechanism in the unlocked state with the locking bolt in the closed position FIG. 5 the locking mechanism in the closed state with the locking bolt in the closed position FIG. 6 the locking mechanism in the unlocked state with the locking bolt in the open position FIG. 7 a locking bolt with a gate FIG. 8 a locking bolt with an opening FIG. 9 a diagram for the shifting of the locking bolt FIG. 10 the lock housing with a microswitch with fuel tank cap or tailboard closed FIG. 11 the lock housing with a microswitch with fuel tank cap or tailboard open FIG. 12 the lock housing with echo sensor with fuel tank cap or tailboard open and FIG. 13 the lock housing with echo sensor with fuel tank cap or tailboard closed
Figure 2:
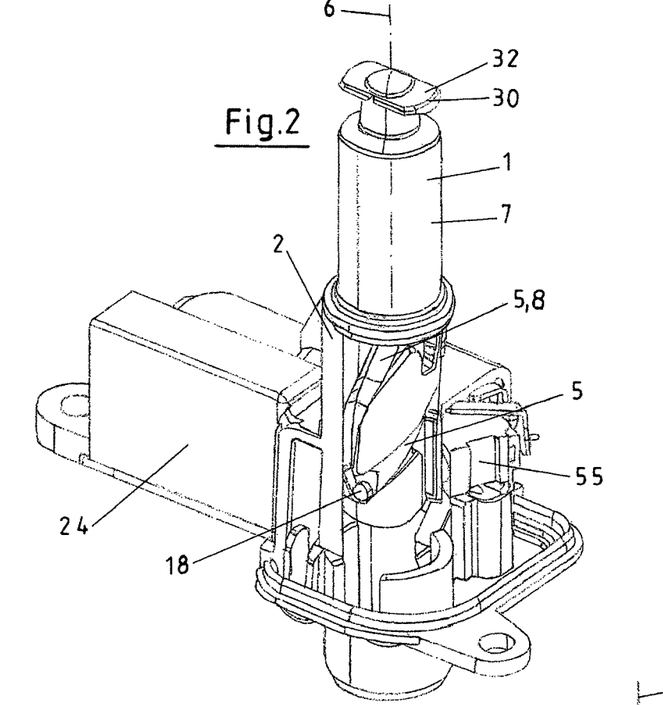

In the illustration in accordance with FIG. 2 the locking bolt 1 was moved into its closed position, i.e. pressed downwards in the direction of its longitudinal axis 6. This was achieved via the tailboard or fuel tank cap which is not recognisable here with which the locking bolt 1 is in contact at its upper end 29. The mechanism 30 with the two wings 31 and 32 via which the locking bolt 1 meshes with the tailboard or fuel tank cap is responsible for this. If the latter is closed, the locking bolt 1 is shifted in the direction of the longitudinal axis 6 and around this axis 6 to a simultaneous twisting into the position depicted in FIG. 2.

Figure 3:
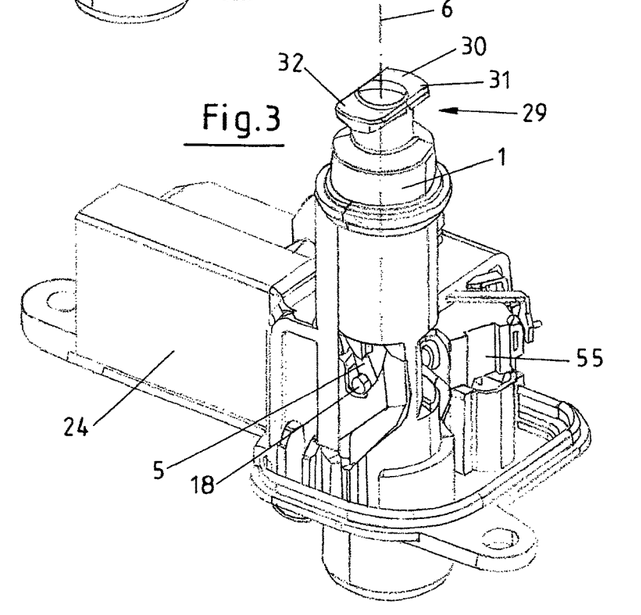

FIGS. 3 to 6 depict the locking mechanism in accordance with the invention in four different positions. In FIG. 3, the lock mechanism is initially shown with a closed tailboard or fuel tank cap and locking bolt 1 is shown in the retracted position. The ratchet 25 which can be controlled via the drive concealed here is recognisable which blocks the locking bolt 1 with its pivoting arm 77; the lock is closed. The ratchet 25 is supported by the spring 26 or the ratchet 25 is kept taut with the force of the spring 26. The pin 18 is in the upper area of the gate 5. The emergency unlocking device which can impact on the pivoting arm 79 of the ratchet 25 is labelled as 80. This can be activated manually or via the drive 86. In this case, the lever 87 acts on the pivoting arm 79.

Figure 4:
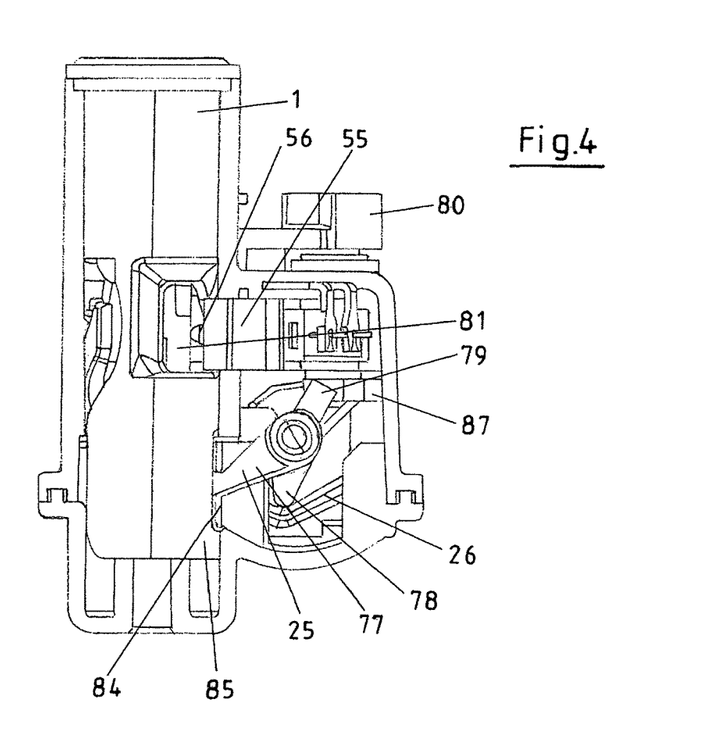

In the illustration in accordance with FIG. 4 the lock is not closed, but the locking bolt 1 is also in the lower closed position. However, the ratchet 25 is not meshed with the locking bolt 1. Consequently, there is no longer any resistance in this regard; the lock is not locked with a locking bolt 1 in the closed position. The pin 18 is in the upper area of the gate 5.

Figure 5:
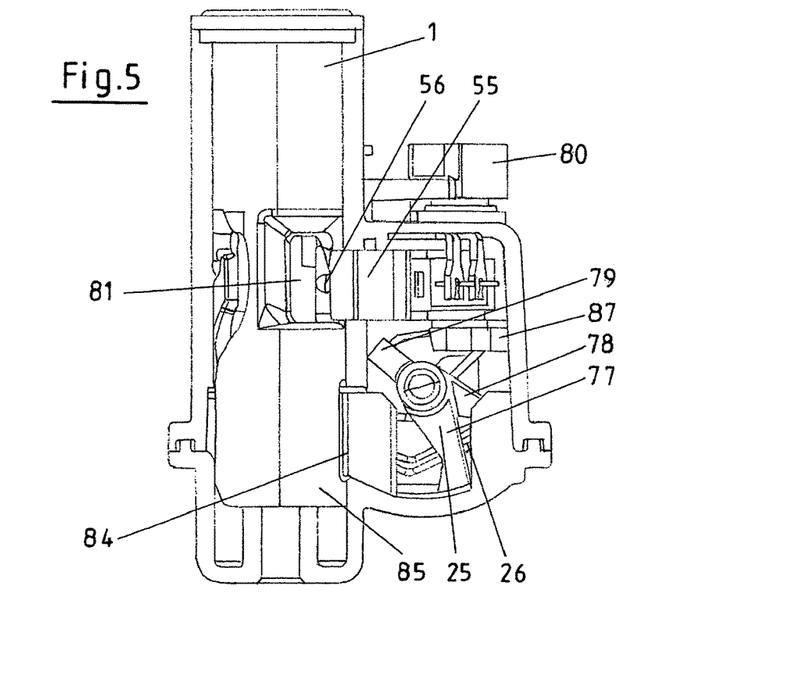

FIG. 5 shows a locked locking mechanism, however with a locking bolt 1 in its upper opening position, the flap is therefore open with the lock locked. Although the ratchet 25 is in the position as corresponds basically to FIG. 3 which is practically ineffective however due to the open locking bolt 1. The pin 18 is in the lower area of gate 5.

Figure 6:
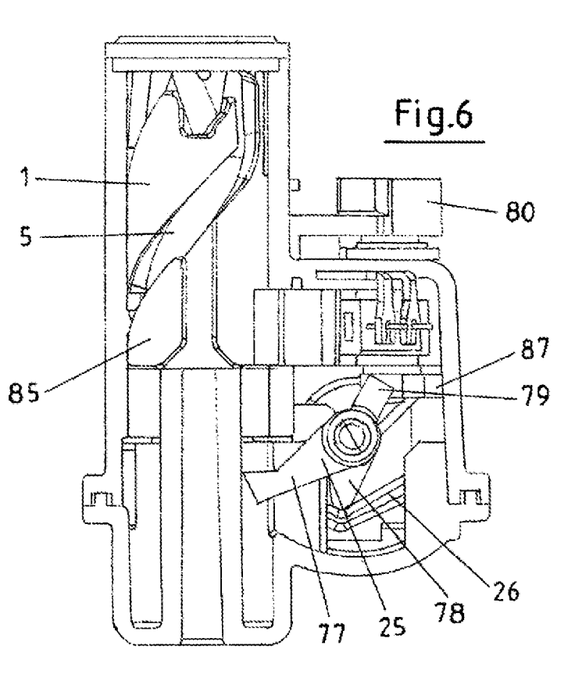

Finally, FIG. 6 shows the locking mechanism with the lock open and the locking bolt 1 in the upper open position. Only when the flap is closed in which the locking bolt 1 is activated can the ratchet 25 mesh with the locking bolt 1. During the closure, the locking bolt 1 executes a rotary movement and the ratchet 25 glides past the locking bolt 1 until the opening 84 at the lower end 85 of the locking bolt 1 is above the ratchet 25 and the ratchet 25 engages into the opening 84. In the engaged position the ratchet 25 then locks the locking bolt, consequently the closed fuel tank cap is locked. The pin 18 is located on the lower section of the gate 5.

Figures 7, 8:
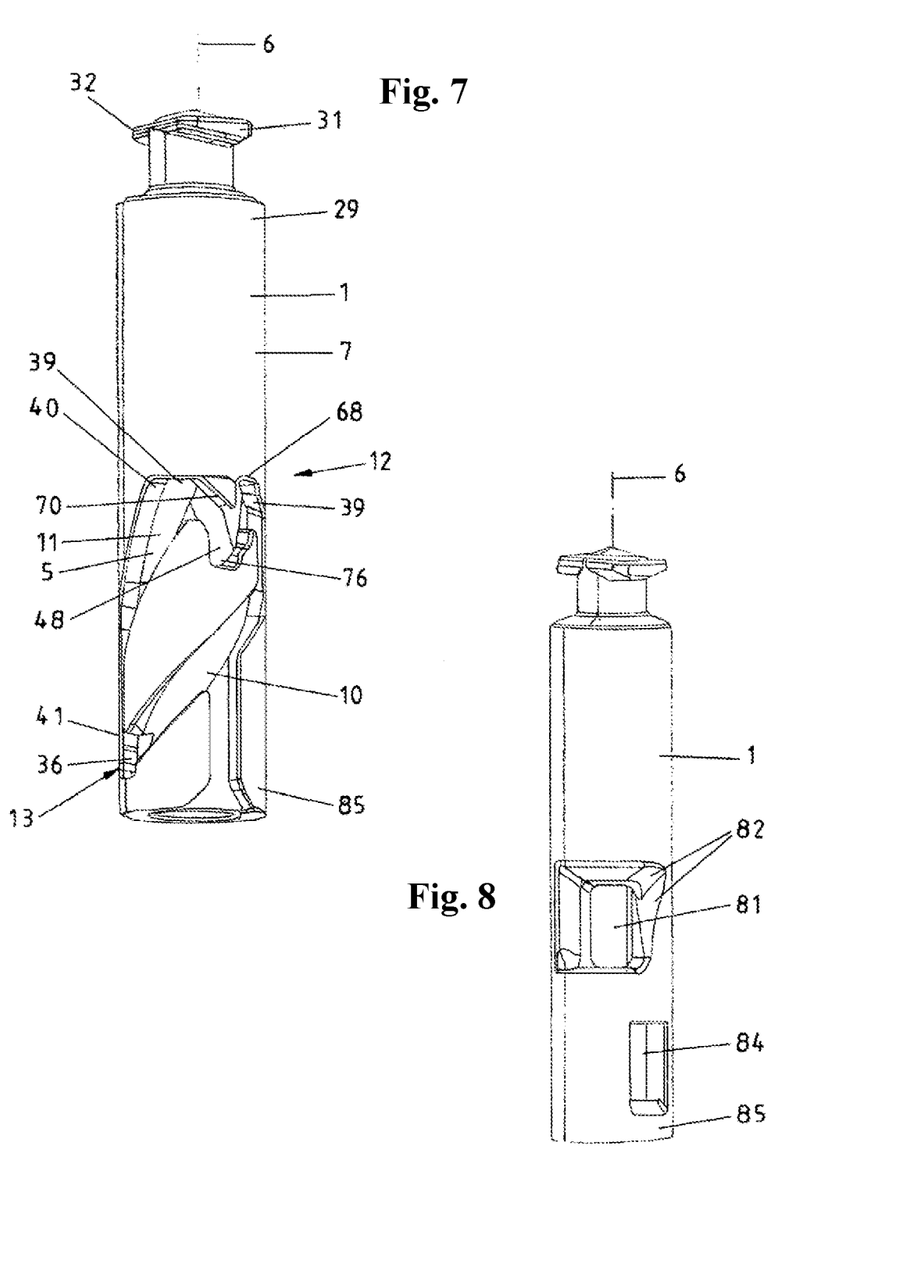

FIG. 7 serves to illustrate the mechanism in the movement of the locking bolt 1, here with the additional gate section 48, for security. A total of eight positions on the gate 5 are illustrated with the reference signs 36, 39, 64, 65, 66, 63, 40 and 41, as they depict the force impulsion on the bolt side with the housing side pin which is not depicted here. The position at the lower end of the gate 5 is labelled with 36. If the pin now passes the diagonal section 10 when the locking bolt 1 is activated from the extended open position into the retracted closed position, it gets into position 39 and namely by activation against the force of the torsion and compression spring. Only against the force of the latter does the pin reach the arrow direction 67 at the point to be labelled with the reference sign 64. There the gate section 48 starts to secure a holding position of the locking bolt in its closed state. The passage of this gate section is symbolised by arrows 68, 76 and 70. The gate section 48 is roughly V-shaped, whereby the two flanks 70 and 68 of the gate section 48 are still connected to one another via a horizontal section or a transition 76. It becomes obvious in this depiction that it is practically precluded that the pin leaves the basin-like gate section 48, insofar as the locking bolt 1 is not consciously activated in a relevant manner. It is not illustrated that the pin can get from position 64 to position 65 fundamentally by the support for example of a rubber seal on the fuel tank cap or tailboard. The locking bolt 1 then heads in an arrow direction 66 from position 65 to position 66 via the torsion spring.

FIG. 8 depicts a locking bolt 1 with the two openings 81 and 84. The opening 81 corresponds to the switch of the switching device, i.e. the opening is exactly arranged in the locking bolt 1 that it corresponds with the switch in the retracted position of the locking bolt 1. More precisely, the switch can enter the opening 81 in the latter and leave the opening 81 again thanks to the guide gate 82. This is associated with relevant signalling that the locking bolt 1 is now in its retracted, lower position. The purpose of the lower opening 84 at the lower end 85 of the locking bolt 1 is to guarantee the engagement of the ratchet, i.e. the ratchet travels along the contour of the locking bolt 1 until it can engage in the opening 84 due to the rotation or longitudinal shifting of the locking bolt 1 and blocks a further movement of the locking bolt 1.

Figure 9:
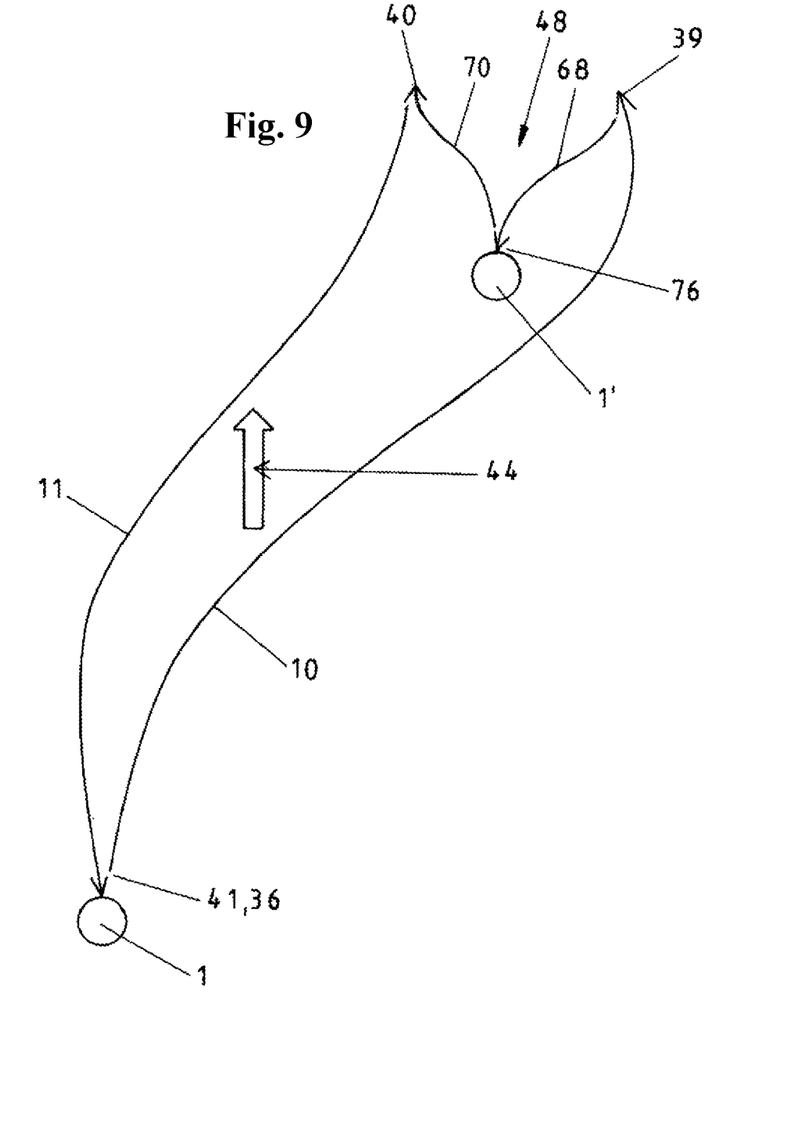

FIG. 9 shows the bolt with the actual security section. Here too, a total of eight positions are labelled with the reference signs 36, 39,64, 65, 66, 63, 40 and 41. If the non-illustrated pin passes the diagonal section when the locking bolt retracts, it initially attains position 39 and then position 64 via the horizontal section 67. It joins the gate section 48 for security, consisting of the two v-shaped flanks 68 and 70 arranged with one another, connected by a transition 76, which depicts the secured closed position. Positions 63 and 40 connect to the flank 70 of the gate section 48 until the pin reattains position 41 at the lower end 13 of the gate 5 via the diagonal 11.

Figure 10:
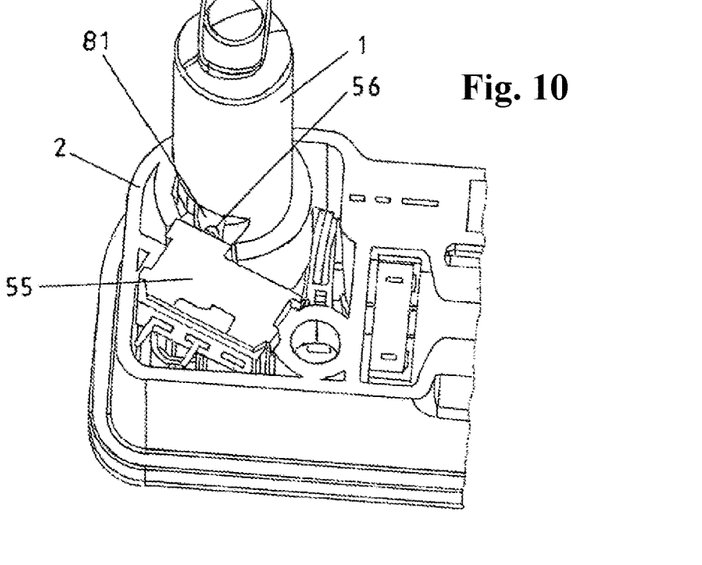

The object of FIG. 10 is the view into the housing 2 of the lock. The switching mechanism 55 acting as a detection device 54, a microswitch, is assigned to the locking bolt 1. The fuel tank cap or tailboard is closed, the locking bolt 1 is in the retracted, depressed position.

Figure 11:
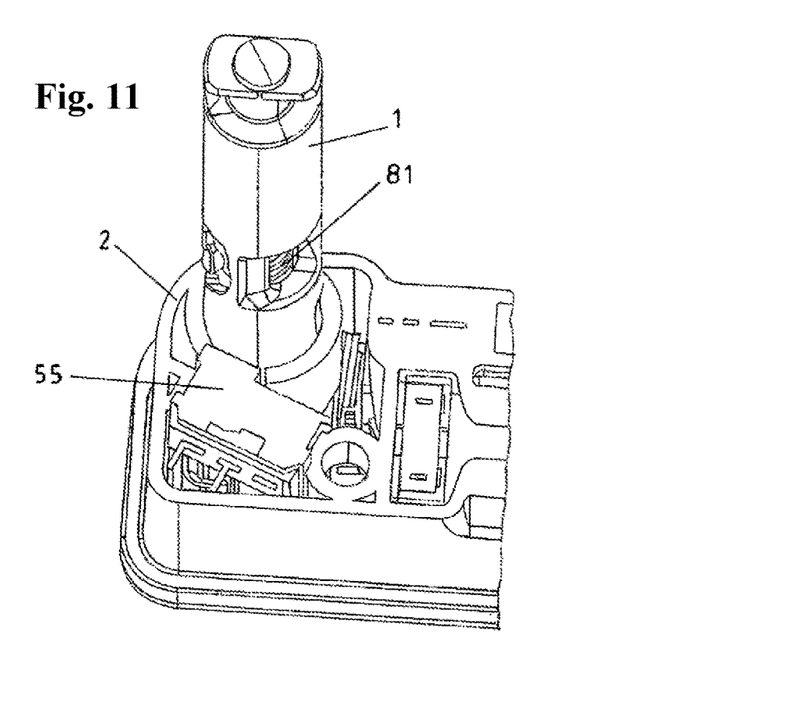

In contrast to the illustration in accordance with FIG. 11, the flap is open here. The locking bolt 1 is in the extended position. The switch 56 has assumed its position in the locking bolt 1 in the opening concealed by the switching mechanism 55, there is relevant signalling that the locking bolt 1 is in its extended open position.

Figure 12:
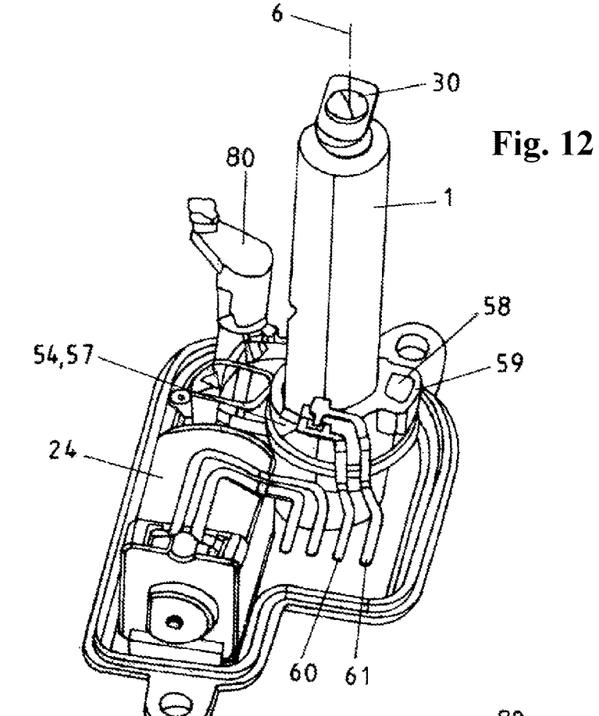

FIG. 12 shows the alternative solution with a detection device 54 formed by an echo sensor 57 and a permanent magnet 58. In the illustration in accordance with FIG. 14 the locking bolt 1 is illustrated in the extended position; the fuel tank cap not illustrated here is open. There is no contact between the echo sensor 57 and the permanent magnet 58 integrated into the locking bolt 1.

Figure 13:
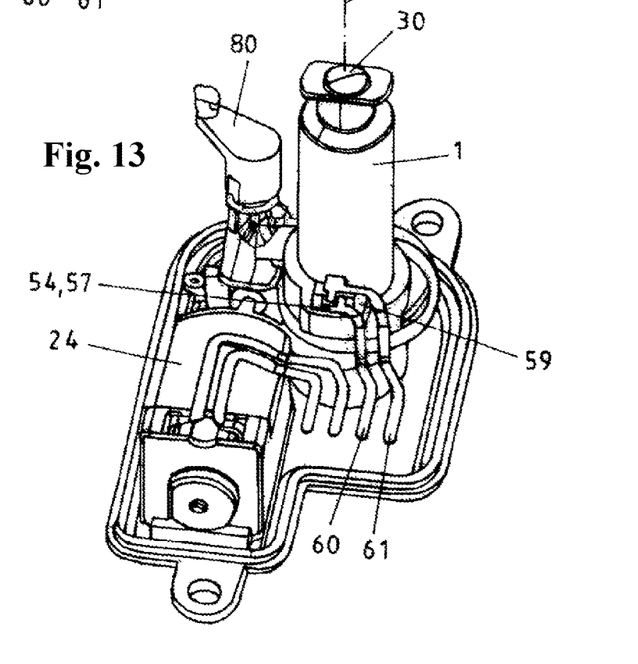

This has changed in the illustration in accordance with FIG. 13. The unrecognisable fuel tank cap or tailboard is closed, i.e. the locking bolt 1 is in its retracted position, after it has rotated around its longitudinal axis 6 in the process. The permanent magnet 58 is concealed to the greatest extent possible by the echo sensor 57. By means of the localisation of the magnet 58 the echo sensor 57 therefore records the movement of the locking bolt 1 between its extended and retracted position, whereby such a contactless interplay between the echo sensor 57 and the permanent magnet 58 is especially suited as a detection mechanism 54, if a comparatively small detection mechanism is required. Another mechanical emergency unlocking mechanism is described with the reference sign 62. Stamping grids 60 and 61 are also shown, where they may for example be used to control lighting not illustrated here in the area of the flap opening via the position of the locking bolt 1. The use of the lighting can thus be limited to the states in which the fuel tank cap 14 opens and the locking bolt 1 is in its extended position, as shown in FIG. 14.

The invention claimed is:

1. Lock for a fuel tank cap or tailboard in a vehicle, the lock comprising:

a locking bolt which can be shifted between an open and closed position by opening and closing the fuel tank cap or tailboard, wherein the locking bolt in the housing of the lock is force impelled against the force of a compression spring in the direction of a longitudinal axis and around the longitudinal axis of the locking bolt;

wherein the locking bolt has a single-piece construction such that the locking bolt moves along the longitudinal axis and rotates about the longitudinal axis as a single piece;

the locking bolt comprises a housing having a lateral surface that includes on said lateral surface a self-contained gate that has a diagonal surface relative to the longitudinal axis; and a pin received within the gate, wherein interaction of the pin against the diagonal surface force impels against the force of the compression spring in the direction of the longitudinal axis and around the longitudinal axis;

wherein the lock is equipped with a detection device for the state of opening of the fuel tank cap or tailboard;

wherein a switching mechanism serves as the detection device which records the position of the locking bolt, whereby a switch of the switching mechanism fits closely to a contour of the locking bolt;

wherein the locking bolt has an opening with a guiding gate, wherein when the locking bolt is in the closed position the switch extends into the opening and is actuated, and when the locking bolt is in the open position the switch is retracted from the opening, and the switch moves between being in the opening and outside the opening by operation of the guiding gate, and the switch glides along the contour of the locking bolt externally from the opening as the locking bolt moves between the open and the closed position; and wherein the gate has two diagonal surfaces fundamentally opposite one another relative to the longitudinal axis, and the pin moves between the two diagonal surfaces, and a gate section is provided at an upper end of the gate between the two diagonal surfaces to secure a holding position of the locking bolt in the closed position.

2. Lock in accordance with claim 1, wherein the gate is bevelled in its corner points.

3. Lock in accordance with claim 1, wherein the gate section is fundamentally v-shaped.

4. Lock in accordance with claim 1, wherein an echo sensor in conjunction with a permanent magnet acts as the detection device, whereby the echo sensor or the permanent magnet is assigned to the locking bolt.

5. Lock in accordance with claim 1, wherein an end of the locking bolt includes wings that mesh the with fuel tank cap or tailboard to shift the locking bolt between the open and closed position by opening and closing the fuel tank cap or tailboard.

* * * * *